INVENTOR
William A. Timberman

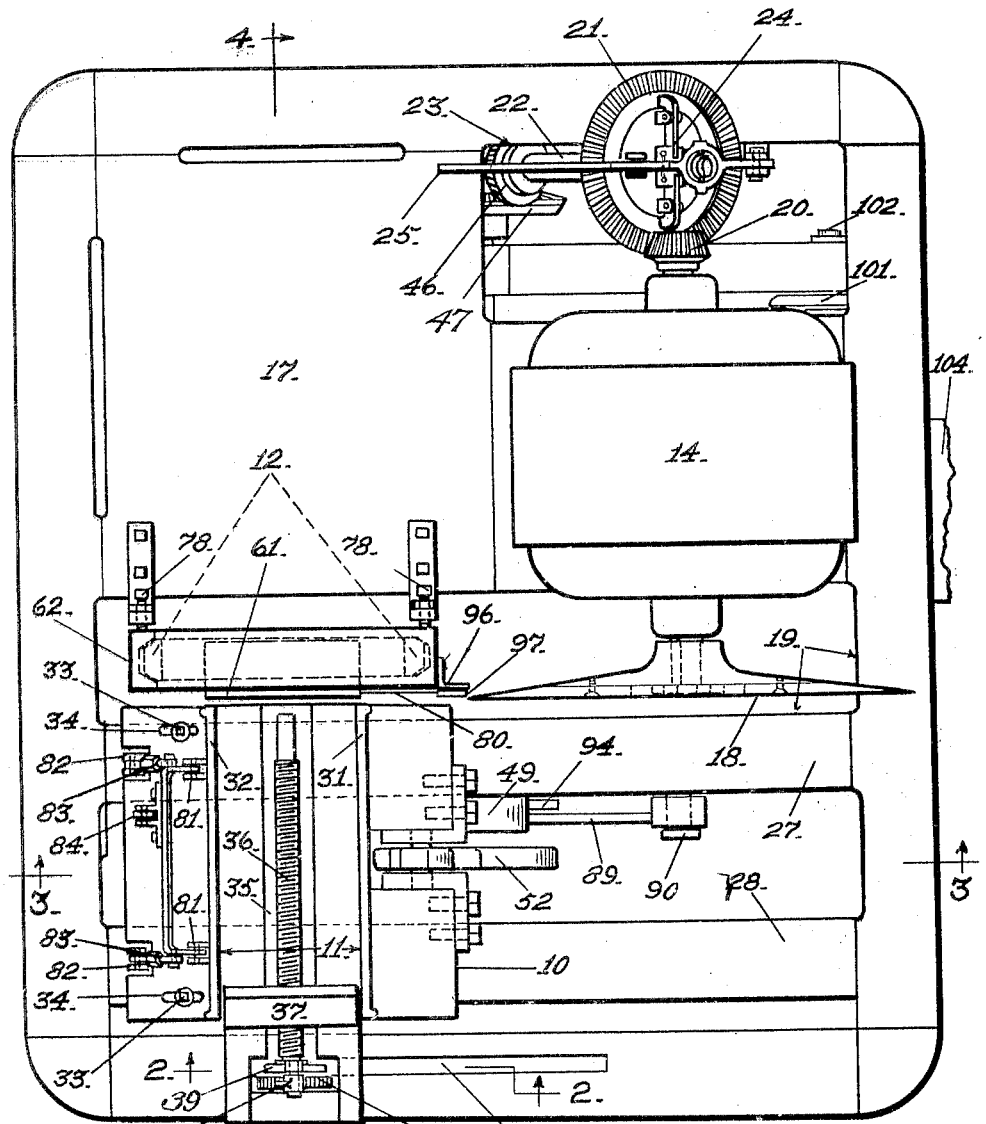

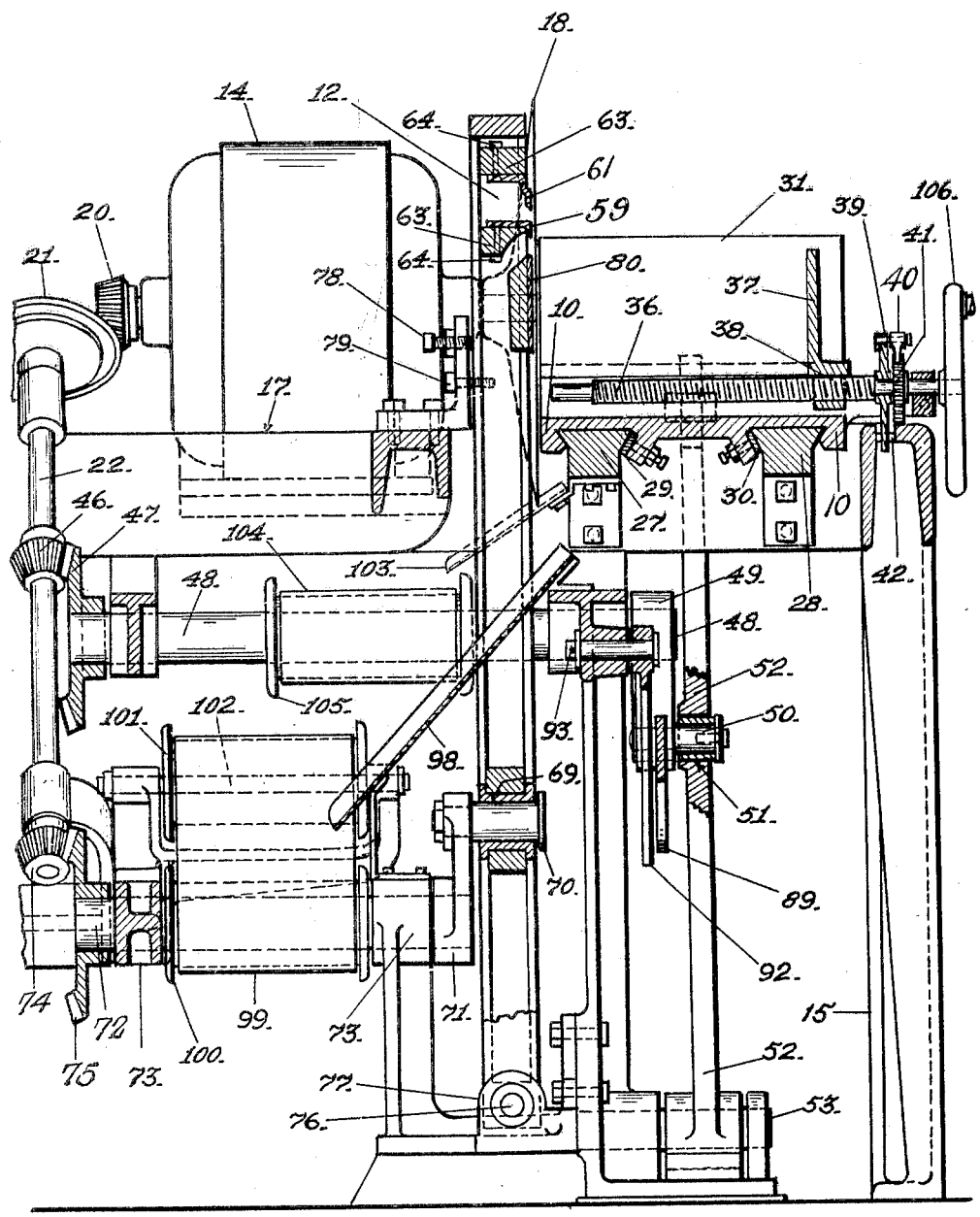

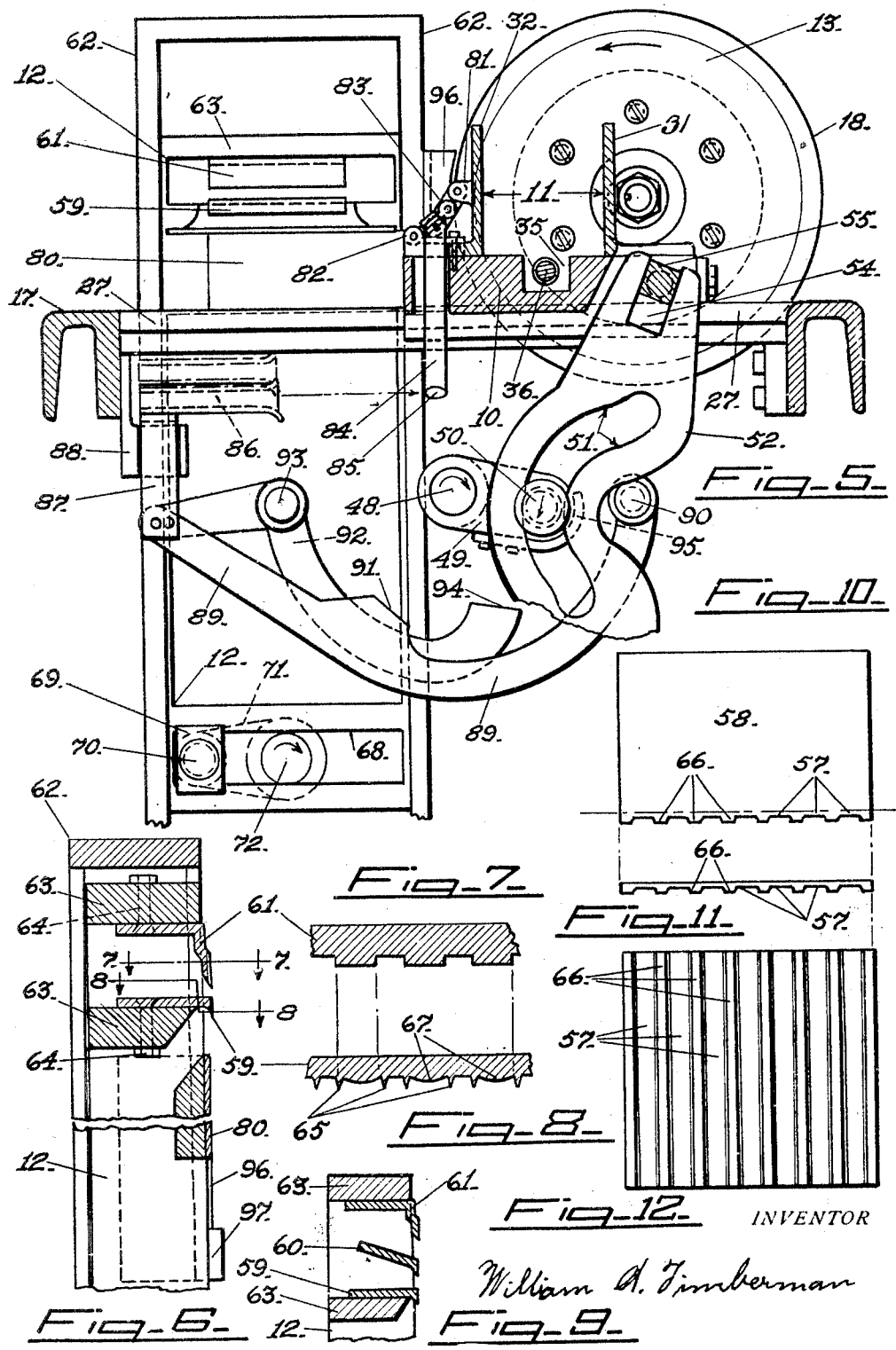

Patented Jan. 26, 1932

1,842,495

UNITED STATES PATENT OFFICE

WILLIAM A. TIMBERMAN, OF LOS ANGELES, CALIFORNIA

MACHINE FOR MAKING BATTERY SEPARATORS

Application filed February 18, 1929. Serial No. 340,925.

This invention relates to machines for producing wooden battery separators of the type that are grooved on one side and plain on the other side. There are many machines in use at the present time for producing battery separators of this general type, many of which have inherent defects either in the machine itself or in the product. Usually several machines are used successively to produce the finished product. This necessitates repeated handling which adds materially to the cost of the product. Then too the use of rotary knives in grooving the separators produces a fuzzy surface in the grooves and makes an inferior product.

The principal object of this invention is to provide a machine for automatically producing battery separators from a green or steamed block. The machine produces finished separators without any supervision or attendance other than that necessary to supply the raw material to the machine. This reduces the cost of production over the non-automatic systems where a large amount of labor and supervision is required.

Another important object of this invention is to provide a single machine for automatically, successively grooving the face of a block and then slicing a separator from the block without releasing the block from the carriage to which it is clamped. After the block is placed in the clamps on the carriage the separators are grooved and then sliced from the block while the block is clamped in place on a moving carriage. No handling is required other than that required to place the block in the machine and remove the small waste piece at the end. In this way one man is able to attend several machines with a consequent reduction in the labor required to produce the separators. The labor is the biggest item in the cost of the separator so that the reduction in cost would be very large.

Still another important object of this invention is the provision of a machine which employs reciprocating knives to progressively groove the separators instead of the rotary knives of the sticker type commonly used. The rotary type knife produces a fuzzy cut on the grooves and this fuzz is very detrimental in the battery. The reciprocating knives remove the material in a series of successive long shavings as a hand plane would operate and leaves smooth grooves. Then again the long drawcut of the reciprocating knives does not tend to mash down the fibres of the wood and close the natural pores as the rotary sticker type knives do. This produces a much more desirable separator as the open pores in the wood aid materially in the free circulation of the fluid in the battery.

An object of this invention is to provide a machine which automatically, successively grooves the face of a block and slices a separator from the block while it is rigidly held clamped on a carriage and then automatically releases the clamp and feeds the block forward the required amount and clamps it firmly to the carriage again after which the cycle of operations is repeated. This is continued until the block is consumed.

Another object of this invention is to provide a machine for automatically producing battery separators which utilizes a rotary circular knife successively slicing each separator from a block clamped in the machine. This produces a very smooth surface on the separator as well as reducing the waste incident to producing the separator.

Other objects and advantages will be apparent from the following description and claims.

In the drawings:

Figure 1 is a top plan view of the machine, without a block in place, showing the general arrangement and relation of the parts.

Figure 2 is a section on line 2—2 of Figure 1 in the direction of the arrows showing the detail of the mechanism for advancing the block at the end of each cycle of operations.

Figure 4 is a vertical section on line 4—4 of Figure 1, looking in the direction of the arrow, showing in particular the drive mechanism, the frame carrying the knives, the cross slide for the table and the conveyor belts for removing the chips and the separators.

Figure 5 is an enlarged fragmentary detail of the mechanism for reciprocating the carriage across the rotary circular knife showing the relation of the parts just at the end of the movement of the carriage across the knife as it is about to be returned to the grooving position.

Figure 6 is an enlarged fragmentary cross section of the dado knives and the reciprocating frame that carries them.

Figure 7 is a section on line 7—7 of Figure 6, looking in the direction of the arrows, showing the shape of the dado knife used to make the first or initial cut in the face of the block and the finish cut knife.

Figure 8 is a section on line 8—8 of Figure 6, looking in the direction of the arrows, showing the shape of the dado knife used to make the last or finish cut in the face of the block.

Figure 9 is a fragmentary section of the dado knives showing the arrangement employed when several knives are used.

Figure 10 is a top view of the block after the grooves have been cut in its face and the separator is ready to be sliced from the block.

Figure 11 is an end view of the finished separator.

Figure 12 is an elevation of a finished separator looking at the grooved face.

Throughout the following description the same reference numeral is used to designate the same part in the different views of the drawings.

Figure 3:
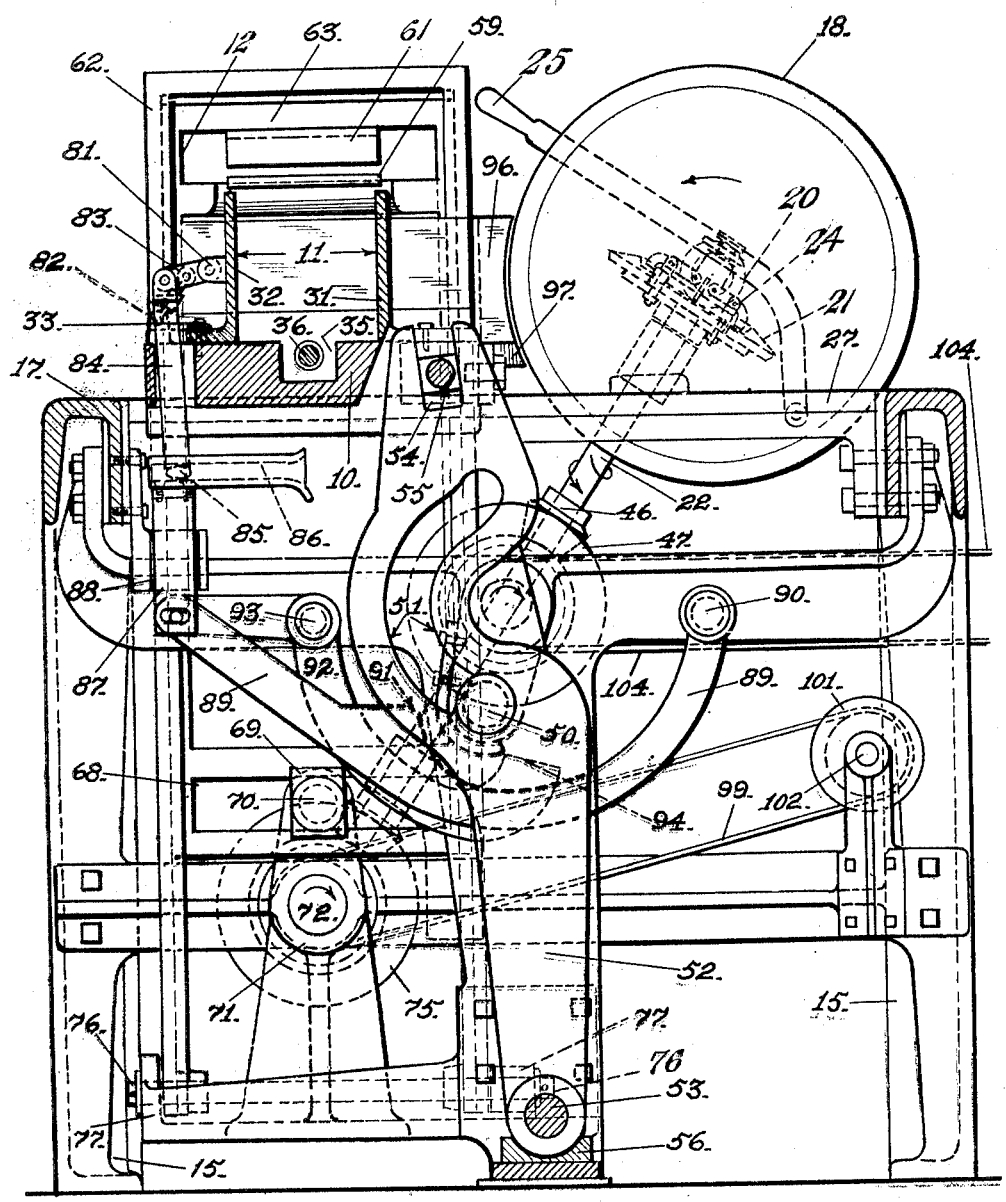
Figure 3 is a section on line 3—3 of Figure 1, in the direction of the arrows, showing the details of the mechanism for clamping and releasing the block, not shown, and the mechanism for advancing the carriage across the circular knife and returning it to the grooving position and holding it in the grooving position.

This machine consists basically of a horizontally reciprocating carriage 10 having a block clamping mechanism 11 mounted on it, a vertically reciprocating knife holding frame 12, a rotary circular knife 13 all driven by a motor 14 and operated in the properly timed relation and sequence by intermediate mechanisms which will be described in detail later. These primary elements and their connecting and driving mechanisms are mounted on a suitable frame. This frame is composed of legs 15, 15 at each corner connected by inverted channel side members 16, 16 and having a top 17, secured thereto.

The motor 14 is mounted on the top 17 at one side thereof and about the middle of the side with its shaft parallel with the side of the frame. A circular knife 18 is mounted on the front end of the motor shaft and this knife runs in an opening 19 in the top of the table. A bevel pinion 20 is mounted on the rear end of the motor shaft. This pinion 20 meshes with a bevel gear 21 on the upper end of a shaft 22 which passes downward at an angle through an opening 23 in the top of the table. A clutch 24 is interposed between the bevel gear and the upper end of the shaft 22 and is operated by a handle 25 hinged to the main frame work at 26 and extending over the bevel gear 21 and the top of the frame, parallel to the back edge thereof.

In front of the rotary knife 18, and parallel with the front face of it, a pair of ways 27 and 28 are provided. The reciprocating carriage 10 slides on these ways which may be of the usual dovetail type as shown. The under side of the carriage is provided with the usual dovetail grooves to receive the rails and the side play is taken up and adjustment for wear made by the usual shims 29 and 30 in the dovetail grooves on the carriage.

A knee block or L shaped block 31 is secured across the carriage 10 on the end nearest the knife. This block is mounted on the carriage with its vertical plane face towards the center of the carriage and at right angles to the ways 27 and 28. A similar block 32 is secured to the other end of the carriage with its plane face parallel to and facing the plane face of the block 31. This latter block 32 is secured to the carriage so that it is free to move from and towards the block 31. The mounting shown consists of bolts 33 passing through slots 34 in the block and threaded into the carriage 10. However a tongue on the block may slide in a groove in the carriage or the construction may be reversed. This block 32 is moved towards and from the knee block 31 to clamp and unclamp the block held between them by a mechanism to be described later.

A recess or groove 35 is provided in the upper surface of the carriage 10, between the clamping blocks 31 and 32 and parallel with the clamping faces thereof. A screw 36 is mounted in this recess and free to rotate therein. A feeder block 37 rests on top of the table 10 between the clamping blocks 31 and 32 and having its plane face at right angles to the plane faces of the clamping blocks and facing the rotary knife 18. This feeder block has a screw threaded nut 38 formed on the bottom of it and lying within the recess or groove 35. The screw 36 passes through the nut 38, with the helical threads of the screw engaging the helical grooves in the nut so that as the screw is rotated in its bearings the nut and the integral feeder block 37 are moved towards or away from the rotary knife 18. This feeder block bears against the back of the block of wood from which the separators are being formed and feeds it forward towards the knife at the proper point in each cycle of operations.

This feeding is accomplished by means of a finger 39 journaled at approximately its midpoint on the forward extension of the screw 36. This is best illustrated in Figure 2. A pawl 40 is pivoted to the upper arm of the finger 39 and engages the teeth of the ratchet wheel 41 which is secured to the screw threaded shaft 36. A recess or pocket 42 is provided in the top of the front frame member in such a position that the lower end of the finger 39 will drop into the recess 42 as the table travels to the left. The finger then engages the side 43 of the recess and turns the finger about the shaft as the table continues to travel to the left. This turns the finger in a counterclockwise direction and the pawl 40, being in engagement with one of the teeth of the ratchet wheel 41, turns the ratchet wheel also to the left a similar amount. Since the ratchet wheel is secured to the screw 36 this is also rotated and propels the feeder block 37 along it the desired distance towards the rotary knife. As the table travels to the right the lower end of the finger strikes the opposite side 44 of the recess 42 and is turned in a clockwise direction about the shaft 36 as the finger emerges from the recess and slides in the groove 45 on the top of the frame 17. The pawl 40 advances in a clockwise direction over the teeth of the ratchet wheel 41 without turning the wheel. As the table moves to the left again the lower end of the finger slides along the groove 45 until it drops in the recess 42 and is turned in a counter-clockwise direction, again feeding the block 37 forward as previously described.

The table is reciprocated by a crank driven by the shaft 22 and operating in a semi-circular slot on a pivoted arm. A bevel pinion 46 is secured to the shaft 22 intermediate its ends and meshes with a bevel gear 47 on the end of a horizontal shaft 48 journaled in the main frame and extending forward to a point near the front of the machine. A crank 49 is secured on the front end of the shaft and has a crank pin 50 projecting forward therefrom. This crank pin 50 extends through a semi-circular slot 51 in an arm 52 which is pivoted on a pin 53 near the bottom of the frame so that it swings back and forth parallel to the ways 27 and 28. The upper end of the swinging arm 52 is provided with a slot 54. A block 55 slides in this slot and is trunnioned in the sliding carriage or table 10. The crank 49 rotates in a clockwise direction, as shown in Figure 5. The crank pin, swinging arm slot and table are so related and proportioned that when the crank pin 50 is in its lowermost position it lies at the bottom of the slot 51 and the swinging arm 52 and table 10 are at their extreme position toward the left.

The slot 51 is made of the same radius as the throw of the crank pin 50 so that as the crank rotates from its lowermost position to its uppermost position the crank 50 slides in the slot 51 without moving the swinging arm 52 or the table 10. In other words; the table 10 is held stationary for this half revolution of the crank 49. When the crank reaches its uppermost position the crank pin reaches the end of the slot 51 and the arm 52 and the carriage or table 10 are moved to the right and then returned to the left as the crank makes the other half revolution and the crank pin travels from the top to the bottom of the semi-circular slot 51. A shoe 56 is provided under the rounded lower end of the swinging arm 52 to take up most of the thrust incidental to moving the table 10 so that the arm will not bind on the pin 53.

When the table, with the block of wood from which the separators are formed is clamped in place, is held stationary at the extreme left hand end of its travel it is positioned directly in front of the mechanism for forming the grooves 57 in the face of the block 58, Figure 10. These grooves are formed by a series of dado knives 59, 60, 61, which are fastened in a vertically reciprocating knife holding frame 12 which slides in vertical guides in the guide frame 62. The knives act the same as the knife in a hand plane and take off a long continuous shaving rather than many short choppy shavings as a rotary planer or sticker knife does. The knives are in general L shaped and are bolted to cross members 63 on the knife holding frame by means of the usual planer knife bolts 64.

The knives are progressive in their action, that is, each knife takes a deeper cut than the preceding one. The first or lowermost, or dado, knife is shaped as shown in Figure 7. The ribs 65 cut channels or slight grooves down each side of the ribs 66 of the separator and the slightly curved portions 67 rough out a little of the material between the ribs. The succeeding knives are shaped as shown in Figure 8, and take successively deeper cuts out of the channels 57. There may be as many of these knives as is desirable to remove the material to the proper depth with the desired depth of cut for each knife. The last knife of the series takes a light cut and finishes up the groove.

The knife holding frame 12 has a cross slide opening 68 across the bottom of it. A crosshead 69 on a crank pin 70 operates in the crosshead and reciprocates the knife holder frame 12 as the crank pin is rotated by the crank 71 on the end of the shaft 72. This shaft is supported by suitable bearings 73 of the main frame and extends essentially parallel with shaft 48 to the rear of the frame. Shaft 72 is driven from the inclined shaft 22 through the medium of a bevel pinion 74 on the lower end of shaft 22 which meshes with a bevel gear 75 on the rear end of shaft 72.

The guide frame 62 is trunnioned at the bottom on a pin 76 held in bearings 77 in the frame. The pin 76 is parallel with the ways 27 and 28 so that the top of the frame swings towards or away from the carriage or table 10. Adjusting screws 78 in the upper part of the main frame bear against the back of the swinging guide frame 62 and the frame is held against the adjusting screws by bolts 79 which passes through a hole in the main frame and threads into the swinging frame 62 thus pulling the swinging frame tightly against the adjusting screws 78. By the proper manipulation of these adjusting screws and clamping bolts the depth of cut of the dado knives is regulated. A brass plate 80 is secured across the face of the knife holding frame 12 just below the knives and parallel with the face of the knives. The end of the block 58 is brought against this plate each time that the block is advanced so that the end of the block is always parallel with the face of the knives and the grooves are always cut to the same depth.

Just before the carriage 10 reaches the end of the return stroke, to the left, and before the feeder finger 39 drops into the pocket 42 the block 58 is unclamped so that it may be fed forward towards the knives. As soon as the block is fed forward the required amount it is again clamped to the carriage 10 for another cycle of operations. This is accomplished by the following mechanism.

As previously described the clamping plate 32 is mounted on the table 10 so that it is free to move towards and from the opposite plate 31. A lug 81 on the back of the clamping block 32 is connected to a similar lug 82 on the end of the carriage 10 by a toggle joint 83. A rod 84 is connected to the toggle joint 83 and extends downward through the table between the ways 27 and 28. The toggle joint is so arranged that when the rod 84 is moved upwards the toggle joint is broken and the clamping plate 32 moved away from the clamping plate 31 to release the block 58. When the rod is moved downward the toggle joint is straightened out to move the plate 32 towards the plate 31 and clamp the block.

The lower end of the rod 84 is provided with a T head 85. This T head is adapted to slide into a T slot 86 formed on the top of the vertically movable rod 87 provided with a guide 88 near one side of the frame. A crescent shaped lever 89 has one of its ends pivoted to the lower end of the rod 87 while its other end is free to rotate about a pin 90 secured to the main frame of the machine. This lever is mounted with the points upward and has a projecting cam surface 91 on its concave surface.

A bell crank 92 is also pivoted to the lower end of the rod 87 and is journaled on a pin 93, in the main frame of the machine, at its fulcrum point. The other end of the bell crank terminates in a cam surface 94 which lies to the right of the cam surface 91 of the lever 89.

The crank 49 has a curved strike plate 95 secured to its outer end which engages the cam surfaces 94 and 91 in succession, as the crank rotates, to first unclamp and then clamp the block on the table 10 as the table travels to the left from the rotary knife.

A guide 96 is secured to the edge of the swinging frame adjacent the rotary knife that contacts with the grooved face of the separator as it is being sliced from the block and prevents any fluttering of the separator which would cause it to break as it was being cut from the block. A bearing plate 97 is also secured to the side of the swinging frame adjacent the rotary knife in such a position that the separator slides over the top of the bearing plate as it is being cut from the block. This prevents the severed portion from being pulled downward by the knife and broken off.

A chute 98 is provided to receive the shavings from the dado knives and deliver them to a conveyor 99 which runs over the driven pulley 100 on the lower shaft 72 and an idler pulley 101 on a shaft 102 on the other side of the machine. This conveyor may deposit the shavings in a suitable receptacle or onto another conveyor to be transported to the waste pile.

A second chute 103 is secured to the way 27 under the rotary knife 13 to receive the formed separators and deposits them on a conveyor belt 104 running over a driven pulley 105 on the shaft 48. This conveyor belt may extend to any desired receptacle or storage place for the separators. A hand wheel 106 is provided on the outer end of the feed screw 36 for the manual adjustment of the feeding block 37.

The operation of the machine is as follows: With the carriage or table 10 near the left hand end of its travel, in front of the dado knives, a green or steamed block of any desired wood of the proper dimensions, is placed on the table between the opened clamp jaws 31 and 32. The feeder block 37 is brought up against the back of the block by the hand wheel 106 and the block moved forward until its face contacts with the plate 80. The clutch on the drive shaft is then thrown in and the machine started. The parts are then in the relative position shown in figure 3 with the T head 85 of the rod 84 in the T slot 86 of the clamp operating mechanism and the knife carrying frame 12 at its uppermost position.

As the shaft 48 rotates in a clockwise direction the striker plate 95 engages the cam surface 91 and forces the rod 87 downward. This pulls the rod 84 downward and closes the toggle 83 forcing the plate 32 towards the plate 31 and clamping the block 58 between them. The shaft 72 is rotating in a clockwise direction at the same time the knife carrying frame is drawn downward and forms the grooves in the face of the block. During this operation the crank pin 50 on the upper shaft is traveling in the semi-circular slot in the arm 52 so that the table 10 remains stationary.

The cranks 49 and 71 are set approximately 180 degrees apart so that when the knives have reached the bottom of their stroke the pin 50 has reached the upper end of the semi-circular slot in the arm 52 and moves the carriage or table 10 to the right. This feeds the block across the rotating circular knife which slices off a completed separator from the face of the block as illustrated by the dotted line in Figure 10. This separator drops onto the conveyor 104 and is carried away. The various parts are now in the relative position shown in Figure 5.

The further rotation of the crank 49 moves the carriage or table 10 to the left again until it is once more opposite the knives where it is once more held stationary. Simultaneously the crank 71 returns the knives to the top of their stroke. As the table moves to the left the T head of the rod 84 enters the slot 86. The strike plate 95 then engages the cam surface 94 forcing the rod 87 upward and breaking the toggle joint. This unclamps the block on the table. The feed finger 39 then drops into the recess 42 and feeds the block ahead an amount equal to the thickness of a separator plate. The strike plate then engages the cam surface 91, clamping the block on the table again and the cycle is repeated. This is continued until the block is used up, when a new block is inserted and the process started again.

The foregoing description embodies the preferred form of my invention for the purpose of explaining in a concrete form the underlying principles involved. In the practical use of this invention I may employ such mechanical equivalents and make such changes in structure and arrangement as lie within the scope of the appended claims.

I claim:

1. In a machine for manufacturing battery separators: a frame; a table reciprocably mounted on said frame; clamping means on said table, adapted to secure a block of wood thereon; a plurality of knives reciprocably mounted on said frame at one end of the travel of said table; said knives comprising a scoring knife and grooving knives adapted to progressively remove the material from the grooves defined by the scoring knife; a circular knife rotatably mounted on said frame at the other end of the travel of said table; means for feeding said block towards said knives; means for continuously reciprocating said knives; means for periodically reciprocating said table and co-ordinated means for operating said elements in repeated cycles of successive co-ordinated operations as and for the purpose specified.

2. In a machine for manufacturing battery separators: a frame; a table reciprocably mounted on said frame; clamping means on said table, adapted to secure a block of wood thereon; a swinging frame pivoted at the bottom to said frame adapted to swing towards and from said table; means for securing said swinging frame in a predetermined position; a plurality of superposed grooving knives reciprocably mounted in said swinging frame; means to reciprocate said knives; a circular knife rotatably mounted on said frame, parallel with and adjacent to said swinging frame; means for feeding said block towards said knives; means for periodically reciprocating said table in predetermined relation with the movement of said grooving knives, and gears connecting said various operating means to maintain them in predetermined co-relation during successive cycles of operation as and for the purpose specified.

3. In a machine for manufacturing battery separators: a main frame; a table reciprocably mounted on said main frame; clamping means on said table, adapted to secure a block of wood thereon; a toggle joint between said table and said clamping means, adapted to open and close said clamp; a rod depending from the center pivot of said toggle joint; a T head on the lower end of said rod; a vertically reciprocable clamp operating member mounted on said main frame; a T slot in the upper end of said clamp operating member, adapted to engage the T head on the rod; means to move said clamp operating member at predetermined intervals in fixed relation with the movement of said table; a plurality of superposed grooving knives reciprocably mounted on said main frame at one end of the travel of said table; operating means for said grooving knives; a circular knife rotatably mounted at the other end of the travel of said table and gears connecting the several operating means to maintain them in predetermined co-relation as and for the purpose specified.

4. In a machine for manufacturing battery separators: a main frame; a table reciprocably mounted on ways on said main frame; clamping means on said table adapted to secure a block of wood thereon; a plurality of superposed grooving knives reciprocably mounted on said main frame at one end of the travel of said table; a circular knife rotatably mounted on the main frame at the other end of the travel of said table; an arm pivoted to the main frame near the bottom thereof and adapted to oscillate between said ways; a swinging block pivoted in one end of said table; a slot in the upper end of said arm adapted to engage said block; a cam slot formed in said pivoted arm near the center thereof; a shaft mounted on said frame; a crank pin on the end of said shaft engaging said cam slot; operating means for said grooving knives and gears connecting said shaft and said knife operating means as and for the purpose specified.

5. In a machine for manufacturing battery separators: a main frame; a table reciprocably mounted on ways on said main frame; clamping means on said table adapted to secure a block of wood thereon; a plurality of superposed grooving knives reciprocably mounted on said main frame at one end of the travel of said table; a circular knife rotatably mounted on the main frame at the other end of the travel of said table; an arm pivoted to the main frame near the bottom thereof and adapted to oscillate between said ways; a swinging block pivoted in one end of said table; a slot in the upper end of said arm adapted to engage said block; a cam slot formed in said pivoted arm near the center thereof; a shaft mounted on said frame; a crank pin on the end of said shaft engaging said cam slot; a second shaft mounted on said main frame; a crank pin on the end of said second shaft; operative means connecting said grooving knives with said crank pin; and a drive shaft geared to the aforementioned shafts as and for the purpose specified.

6. In a machine for manufacturing battery separators; a main frame; a table reciprocably mounted on ways on said main frame; clamping means on said table adapted to secure a block of wood thereon; a plurality of superposed grooving knives reciprocably mounted on said main frame at one end of the travel of said table; a circular knife rotatably mounted on the main frame at the other end of the travel of said table; an arm pivoted to the main frame near the bottom thereof and adapted to oscillate between said ways; a thrust block under the lower end of said swinging arm; a swinging block pivoted in one end of said table; a slot in the upper end of said arm adapted to engage said block; a cam slot formed in said pivoted arm near the center thereof, a shaft mounted on said frame; a crank pin on the end of said shaft engaging said cam slot; operating means for said grooving knives and gears connecting said shaft and said knife operating means as and for the purpose specified.

7. In a machine for manufacturing battery separators: a main frame; a table reciprocably mounted on said main frame; clamping means on said table, adapted to secure a block of wood thereon; a toggle joint between said table and said clamping means, adapted to open and close said clamp; a rod depending from the center pivot of said toggle joint; a T head on the lower end of said rod; a vertically reciprocable clamp operating member mounted on said main frame; a T slot in the upper end of said clamp operating member, adapted to engage the T head on the rod; operating arms pivoted to said main frame and to said clamp operating member; cam surfaces on said operating arms; a crank operatively connected with said table to reciprocate it at predetermined intervals; a cam on said crank adapted to contact with the cam surfaces on said operating arms; a plurality of superposed grooving knives reciprocably mounted on said main frame at one end of the travel of said table; operating means for said grooving knives; a circular knife rotatably mounted at the other end of the travel of said table and gears connecting the several operating means to maintain them in predetermined co-relation as and for the purpose specified.

8. In a machine for manufacturing battery separator plates; a main frame; a table reciprocably mounted on said main frame; clamping means on said table adapted to secure a block of wood thereon; a plurality of superposed grooving knives reciprocably mounted on said main frame at one end of the travel of said table; a circular knife rotatably mounted near the other end of the travel of said table and adapted to slice a separator from said block; supporting means extending back of said rotary knife adapted to contact with the bottom of the separator as it is being sliced from the block and means operating the various elements in predetermined relation as and for the purpose specified.

9. In a machine for manufacturing battery separator plates; a main frame; a table reciprocably mounted on said main frame; clamping means on said table adapted to secure a block of wood thereon; a plurality of superposed grooving knives reciprocably mounted on said main frame at one end of the travel of said table; a circular knife rotatably mounted near the other end of the travel of said table and adapted to slice a separator from said block; guide means on said main frame adjacent said rotary knife, adapted to contact with the face of the separator as it is being sliced from the block to prevent fluttering of the separator; and means operating the various elements in predetermined relation as and for the purpose specified.

10. In a machine for manufacturing battery separators: a main frame; a table reciprocably mounted on ways on said main frame; clamping means on said table adapted to secure a block of wood thereon; a plurality of superposed grooving knives reciprocably mounted on said main frame at one end of the travel of said table; a circular knife rotatably mounted on the main frame at the other end of the travel of said table; an arm pivoted to the main frame near the bottom thereof and adapted to oscillate between said ways; a swinging block pivoted in one end of said table; a slot in the upper end of said arm adapted to engage said block; a cam slot formed in said pivoted arm near the center thereof; a shaft mounted on said frame; a crank pin on the end of said shaft engaging said cam slot; a second shaft mounted on said main frame; a crank pin on the end of said second shaft; operative means connecting said grooving knives with said crank pin; a conveyor driven by each of said shafts; a chute adapted to deliver the completed separators to one conveyor; a second chute adapted to deliver the shavings from the grooving knives to the second conveyor; and a drive shaft geared to the aforementioned shafts as and for the purpose specified.

11. A machine for manufacturing battery separators comprising reciprocable means for holding a block of wood, reciprocating knives adapted to groove the face of the block, a rotary knife adapted to slice a separator from the block and means for alternately holding the reciprocable holder adjacent the grooving means and moving it across the face of the slicing knife.

12. A machine for manufacturing battery separators comprising a reciprocable holding means adapted to secure a block of wood, reciprocating knives adapted to groove the face of the block, a rotary knife adapted to slice a separator from the block and means, timed in relation to the grooving means, for alternately maintaining the holding means stationary adjacent the grooving means and moving it across the face of the slicing knife.

13. A machine for manufacturing battery separators comprising a reciprocable holding means adapted to secure a block of wood, reciprocating knives adapted to groove the face of the block, a rotary knife adapted to slice a separator from the block, means to alternately maintain the holding means stationary adjacent the grooving knives while they are operating on the block and moving it across the face of the slicing knife and means for co-relating the movement of the grooving knives and the holding means.

14. A machine for manufacturing battery separators comprising a reciprocable holding means adapted to secure a block of wood, reciprocating knives adapted to shave the groove in the face of a green block, a rotary knife adapted to slice a separator from the block and means, timed in relation to the grooving means, for alternately maintaining the holding means stationary adjacent the grooving means and moving it across the face of the slicing knife.

15. A machine for manufacturing battery separators comprising a reciprocable holding means adapted to secure a block of wood, reciprocating knives adapted to shave the groove in the face of a green block, a rotary knife adapted to slice a separator from the block, means to alternately maintain the holding means stationary adjacent the grooving knives while they are operating on the block and moving it across the face of the slicing knife and means for co-relating the movement of the grooving knives and the holding means.

In testimony whereof I have signed my name.

WILLIAM A. TIMBERMAN.